(12) United States Patent
Sengupta et al.

(10) Patent No.: US 9,648,557 B2
(45) Date of Patent: *May 9, 2017

(54) SYSTEM, METHOD, AND COMPUTER-READABLE MEDIUM FOR USER EQUIPMENT DECISION-MAKING CRITERIA FOR CONNECTIVITY AND HANDOVER

(71) Applicant: Seven Networks, LLC, Marshall, TX (US)

(72) Inventors: Chaitali Sengupta, Richardson, TX (US); Yuan Kang Lee, San Diego, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,622

(22) Filed: Oct. 4, 2014

(65) Prior Publication Data
US 2015/0065123 A1  Mar. 5, 2015

Related U.S. Application Data

(63) Continuation of application No. 11/929,231, filed on Oct. 30, 2007, now Pat. No. 8,923,852.

(Continued)

(51) Int. Cl.
*H04W 4/00* (2009.01)
*H04W 48/18* (2009.01)
(Continued)

(52) U.S. Cl.
CPC .......... *H04W 48/18* (2013.01); *H04W 36/24* (2013.01); *H04W 36/14* (2013.01); *H04W 88/06* (2013.01)

(58) Field of Classification Search
CPC ..... H04W 36/14; H04W 36/24; H04W 48/18; H04W 88/06
See application file for complete search history.

(56) References Cited

U.S. PATENT DOCUMENTS 7,318,111 B2  1/2008  Zhao
8,155,081 B1  4/2012  Mater et al.
(Continued)

FOREIGN PATENT DOCUMENTS

EP      1531646 A1    5/2005
WO   2008155444 A1   12/2008
WO   2009/078675 A1   6/2009

OTHER PUBLICATIONS

File history for U.S. Appl. No. 11/929,231.
(Continued)

*Primary Examiner* — Marcus Hammonds
(74) *Attorney, Agent, or Firm* — NK Patent Law, PLLC (57) ABSTRACT

A method of selecting a network from a plurality of available access networks is provided. The method includes identifying, by using a wireless user equipment, the plurality of access networks and identifying, by using a wireless user equipment, an invoked application. The method includes selecting, by using a wireless user equipment, a first access network from the plurality of access networks based, at least in part, on the application. A connection is established to the first access network in response to an application requirement. A handover procedure is invoked from the first access network to a second access network of the plurality of access networks in response to application requirements.

28 Claims, 5 Drawing Sheets

Related U.S. Application Data (60) Provisional application No. 60/863,931, filed on Nov. 1, 2006.

(51) Int. Cl.
*H04W 36/24* (2009.01)
*H04W 88/06* (2009.01)
*H04W 36/14* (2009.01)

(56) References Cited

U.S. PATENT DOCUMENTS

| | | |
|---|---|---|
| 8,811,187 B2 | 8/2014 | Macias et al. |
| 8,849,276 B2 | 9/2014 | Guilford et al. |
| 2004/0070511 A1* | 4/2004 | Kim ............... G01R 31/3606 340/636.1 |
| 2006/0025169 A1 | 2/2006 | Maciocco et al. |
| 2006/0099952 A1* | 5/2006 | Prehofer ............. H04W 36/24 455/440 |
| 2006/0223465 A1* | 10/2006 | Akiba ............. H04W 52/0277 455/127.4 |
| 2006/0285519 A1* | 12/2006 | Narayanan ........... H04L 63/061 370/331 |
| 2007/0004393 A1* | 1/2007 | Forsberg ............. H04L 63/102 455/420 |
| 2007/0165572 A1 | 7/2007 | Lenzarini |
| 2007/0248056 A1 | 10/2007 | Feng et al. |
| 2007/0255797 A1 | 11/2007 | Dunn et al. |
| 2008/0076428 A1* | 3/2008 | Jagadeesan ........... H04W 36/30 455/436 |
| 2008/0130662 A1 | 6/2008 | Kotulla et al. |
| 2009/0286534 A1 | 11/2009 | Garg et al. |
| 2010/0099393 A1 | 4/2010 | Brisebois et al. |
| 2010/0128696 A1 | 5/2010 | Fantini et al. |
| 2010/0150105 A1 | 6/2010 | Miao et al. |
| 2011/0187591 A1 | 8/2011 | Walker |
| 2012/0184277 A1 | 7/2012 | Hiltunen et al. |
| 2012/0196644 A1 | 8/2012 | Scherzer et al. |
| 2012/0230304 A1 | 9/2012 | Barbu et al. |
| 2013/0281154 A1 | 10/2013 | Aerrabotu |
| 2014/0105195 A1 | 4/2014 | Balasubarmaniyan et al. |
| 2014/0162648 A1 | 6/2014 | Cui et al. |
| 2014/0220967 A1 | 8/2014 | Pankajakshan et al. |
| 2015/0036672 A1 | 2/2015 | Kim et al. |

OTHER PUBLICATIONS

File history for U.S. Appl. No. 11/929,066.
File history for U.S. Appl. No. 11/929,376.
Final Office Action mailed Mar. 31, 2015 for U.S. Appl. No. 14/195,758.
European Patent Office, Extended European search report to EP patent application No. 13755791.4, Nov. 20, 2015.
EPO Form 1507S, Supplementary European Search Report issued Nov. 15, 2016 for PCT application No. PCT/US2014041429.
Non-Final Office Action mailed Jul. 16, 2016 for U.S. Appl. No. 14/623,467.
EPO, Application No. 07863704.8, File history from Oct. 31, 2007 to Apr. 7, 2016.
EPO, Application No. 07863693.3, File history from Oct. 31, 2007 to Apr. 7, 2016.
EPO, Application No. 07844768.7, File history from Oct. 31, 2007 to Apr. 7, 2016.
EPO, Application No. 09702959.9, File history from Jan. 16, 2009 to Apr. 7, 2016.
USPTO, Notice of Allowance for U.S. Appl. No. 13/956,174, mailed on Feb. 17, 2016.
USPTO, supplemental Notice of Allowance for U.S. Appl. No. 13/956,174, mailed on Feb. 25, 2016.
USPTO, Non-Final Office Action in U.S. Appl. No. 15/342,095 dated Jan. 31, 2017.

* cited by examiner

| Operator Profile | IMS Service | Cellular Service | WLAN Service | WiMAX Service |
|---|---|---|---|---|
| Cellular Carrier | A | A | B (roam) | C (roam) |
| Cellular Carrier with WLAN | A | A | A | B (roam) |
| WiMAX Carrier | A | B (roam) | C (roam) | A |
| Carrier with all services except WLAN | A | A | B (roam) | A |
| Carrier with all services | A | A | A | A |

Figure 5

| Feature | Home WLAN good Cellular good | Home WLAN good Cellular bad | Around Town No WLAN Cellular good | HotSpot WLAN good Cellular good | HotSpot WLAN good (roam) Cellular good | HotSpot WLAN good (home) Cellular good (roam) |
|---|---|---|---|---|---|---|
| Emergency call | Cellular | WLAN | Cellular | Cellular | Cellular | Cellular |
| VoIP | WLAN | WLAN | CS Voice | WLAN | CS Voice | WLAN |
| Presence | WLAN | WLAN | Cellular | WLAN | User/operator preference | WLAN |
| Push to Talk | WLAN | WLAN | Cellular | WLAN | User/operator preference | WLAN |
| Multicast | WLAN | WLAN | Cellular | WLAN | User/operator preference | WLAN |
| Video conference | WLAN | WLAN | Cellular | WLAN | User/operator preference | WLAN |
| Voice call (CS) | VoIP | VoIP | Cellular | VoIP | Cellular | VoIP |
| Email - push | WLAN | WLAN | Cellular | WLAN | User/operator preference | WLAN |
| Email - pull | WLAN | WLAN | Cellular | WLAN | User/operator preference | WLAN |
| Web - http | WLAN | WLAN | Cellular | WLAN | User/operator preference | WLAN |
| File download | WLAN | WLAN | Cellular | WLAN | User/operator preference | WLAN |
| Podcasting | WLAN | WLAN | Cellular | WLAN | User/operator preference | WLAN |
| RSS | WLAN | WLAN | Cellular | WLAN | User/operator preference | WLAN |

Figure 6

SYSTEM, METHOD, AND COMPUTER-READABLE MEDIUM FOR USER EQUIPMENT DECISION-MAKING CRITERIA FOR CONNECTIVITY AND HANDOVER

CROSS-REFERENCE

This patent application claims the benefit of provisional U.S. Patent Application Ser. No. 60/863,931, filed Nov. 1, 2006, which is hereby incorporated by reference.

The following applications also claim priority to the above referenced provisional application and are related to the present application. They are incorporated by reference herein.

Copending U.S. Utility patent application Ser. No. 13/929,066, filed on Oct. 30, 2007 and entitled "System, Method, and Computer-Readable Medium for Selecting a Network for Connectivity and Handover Based on Application Requirements"

Copending U.S. Utility patent application Ser. No. 13/929,376, filed on Oct. 30, 2007 and entitled "System, Method, and Computer-Readable Medium for User Equipment Managing Multiple Radio Networks for Handover and Low-Power Operations"

BACKGROUND

IP multimedia subsystem (IMS) is a standardized architecture for provisioning of mobile and fixed multimedia systems. IMS provides for the transformation of the core wireless network architecture for efficient and cost-effective delivery of advanced multimedia services. Though driven by the 3.sup.rd Generation Partnership Project (3GPP), IMS is designed to be access agnostic—i.e., it enables access to advanced services via GSM, W-CDMA, CDMA2000, WiFi and other wireless broadband technologies like WiMAX, as well as fixed broadband systems. IMS aims to create a converged Internet Protocol (IP) infrastructure that allows key network resources to be shared by a wide range of services. IMS uses a voice-over-Internet Protocol (VoIP) scheme based on the standardized implementation of the session initiation protocol (SIP). The IMS standards define a network domain dedicated to the control and integration of multimedia services.

Without IMS, operators are forced to allocate dedicated components to each and every service that is deployed. Such service implementations are not scalable and are highly inefficient in a world in which users are demanding more personalized services and greater flexibility as regards to, for example, mixing and matching offerings. IMS also makes it possible for users to access multiple services in the course of the same call or session. Moreover, IMS enables operators to establish and control quality of service imperatives for individual services while at the same time protecting the overall integrity of network performance. IMS will significantly improve end-user experience by enabling flexible, personalized and seamless communications across access standards. A multi-mode, multi-radio user equipment is capable of obtaining services through multiple radio networks, for example, via a wireless wide area network (WWAN) such as GSM/UMTS and via a wireless local area network (WLAN) such as 802.11a/b/g.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In accordance with an embodiment, a user equipment must decide on a particular network with which to attach, begin active services, and to which network it must handover its active services. For example, if the coverage of GSM/UMTS is poor in an office building, but the coverage of WLAN is good, the user equipment may choose to attach to the WLAN and also to receive incoming voice calls via the WLAN. In such a circumstance, the criteria used by the user equipment may be call quality and potential call quality. In a case where the user equipment chooses the GSM/UMTS network to attach and make outgoing calls, the criteria used by the user equipment may be power consumption and potential power consumption.

Some of the other criteria used by the user equipment may be a user profile that specifies one or more user preference connectivity attributes, available applications of the user equipment, a service subscription of a user associated with the user equipment, a battery monitor of the user equipment, a respective link metrics indicator for each of the plurality of access networks, and application support capabilities of the plurality of access networks as described more fully hereinbelow.

Figure 1:
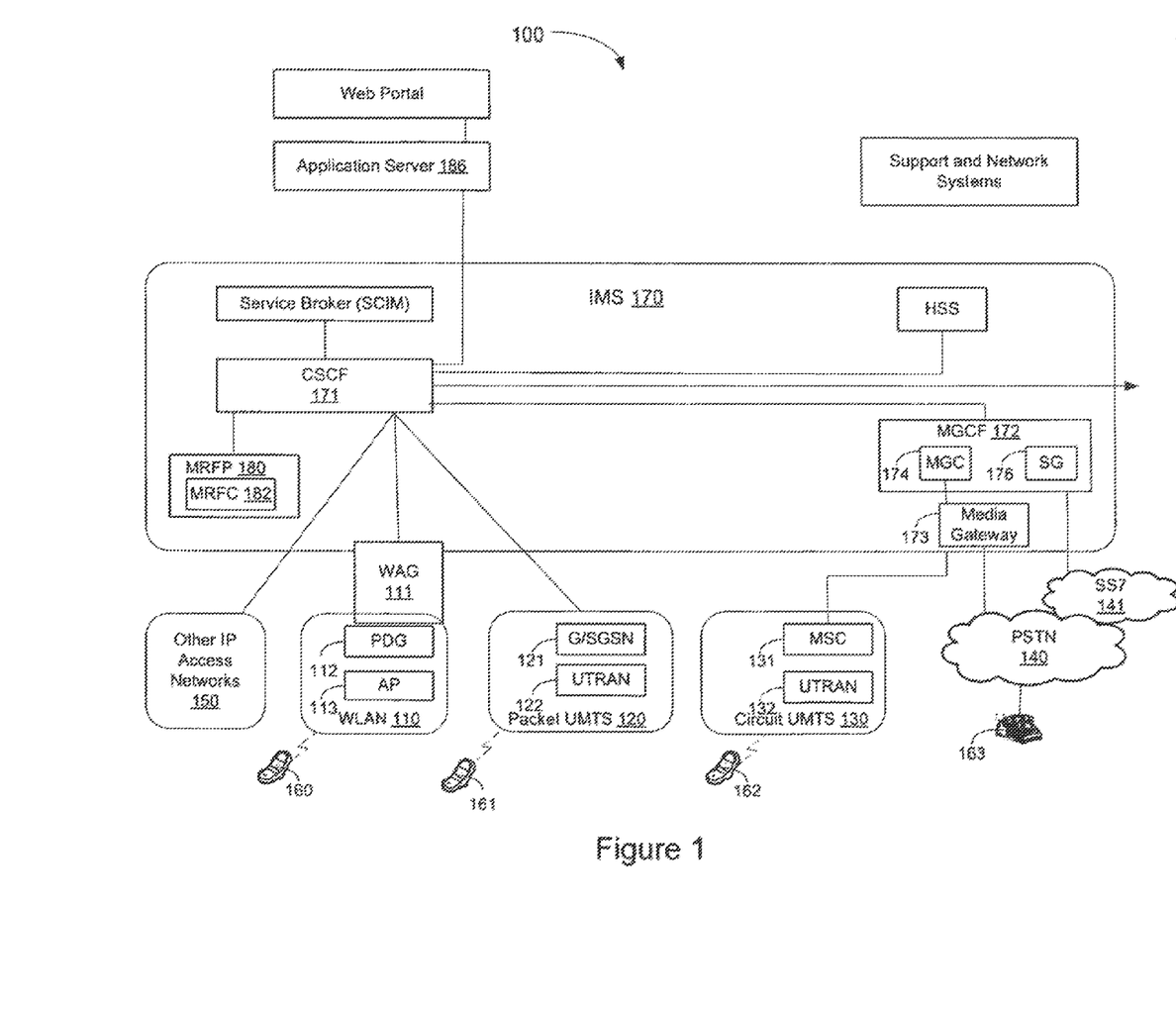
FIG. 1 is a diagrammatic representation of an embodiment of a network system in which IMS may be deployed in accordance with an embodiment.

FIG. 1 is a diagrammatic representation of an embodiment of a network system 100 in which IMS may be deployed. FIG. 1 is intended as an example, and not as an architectural limitation, of embodiments described herein. IMS infrastructure may be deployed in stages and may include infrastructure developed and manufactured by a variety of vendors that may be deployed by any number of service carriers or operators. System 100 may include any variety of access networks. In the illustrative example, system 100 includes a wireless local area network (WLAN) 110, e.g., a network implemented in compliance with the IEEE 802.11 standards, a packet switched universal mobile telecommunications system (UMTS) 120, a circuit switched UMTS 130, a public switched telephone network (PSTN) 140 and corresponding signaling system 141, such as a signaling system #7 network, and other IP access networks 150. PSTN 140 provides circuit switched telecommunication services to one or more circuit switched end points 163. WLAN 110 may interface with IMS 170 via WLAN access gateway (WAG) 111. WLAN 110 may include a packet data gateway (PDG) 112, one or more access points 113 that may provide wireless access to user equipments (UEs) 160-162, and various other equipment as is understood. Packet UMTS 120 may include one or more gateway general packet radio service (GPRS) support nodes (GGSNs) and serving GPRS support nodes (SGSNs) (collectively referred to herein as G/SGSN 121. Packet switched UMTS 120 may include a UMTS radio access network (UTRAN) 122 that may provide radio access to UEs 160-162 and various other equipment as is understood. WAG 111 comprises a gateway between WLAN 110 and 3GPP/IMS network 100. A Packet Data Gateway (PDG) 112 provides access to PS-based services for a WLAN UE. Circuit UMTS 130 may include a mobile services switching center (MSC) 131, a UTRAN 132, and various other equipment as is understood.

Various terminals may connect with one or more of the access networks. As referred to herein, a user equipment (UE) comprises a terminal or station that may connect with one or more access networks for establishing a session with an entity of system 100 or another user equipment or terminal connected with one or more of the access networks of system 100 or another telecommunication system. In the depicted example, UE 160 is connected with WLAN 110, UE 161 is connected with packet UMTS 120, and UE 162 is connected with circuit UMTS 130. Additionally, an analog endpoint 163, such as an analog telephone, is connected with PSTN 140. Some UEs may be adapted to connect, in some instances concurrently, with multiple access networks. A UE adapted to connect with multiple access networks is referred to herein as a multi-mode UE or device.

IMS 170 may include various functions, nodes, or other entities, and those depicted in FIG. 1 are illustrated to facilitate an understanding of embodiments disclosed herein. Call Session Control Function (CSCF) 171 may act as Proxy CSCF (P-CSCF), Serving CSCF (S-CSCF) or Interrogating CSCF (I-CSCF).

SIP may be used as the protocol for communications between a UE with CSCF 171. A Media Gateway Control Function (MGCF) 172 controls the parts of the call state that pertain to connection control for media channels in an IMS-media gateway (MGW), e.g., MGW 173. MGCF 172 may communicate with CSCF 171, a breakout gateway control function (BGCF), e.g., a SIP server that includes routing functionality based on telephone numbers, and PSTN 140 entities. Additionally, MGCF 172 may determine the next hop depending on the routing number for incoming calls from legacy networks. MGCF 172 may include or interface with a media gateway controller (MGC) 174 and a signaling gateway 176.

IMS-MGW 173 may terminate bearer channels from a circuit switched network, e.g., PSTN 140, and media streams, e.g., RTP streams in an IP network, from a packet network, e.g., packet UMTS 120. IMS-MGW 173 may support media conversion, bearer control and payload processing, e.g. codec, echo canceller, conference bridging, and the like. IMS-MGW 173 may interact with MGCF 172 for resource control, own and handle resources such as echo cancellers, etc, and may be equipped with codecs.

A Multimedia Resource Function Controller (MRFC) 182 may control media stream resources in a Multimedia Resource Function Processor (MRFP) 180, interpret information coming from an application server (AS) 186 and S-CSCF, e.g., a session identifier, and control MRFP 180 accordingly.

MRFP 180 may control IP bearers, provide resources to be controlled by MRFC 182, mix incoming media streams, e.g., for multiple parties, sources media streams (for multimedia announcements), and process media streams, e.g., audio transcoding, media analysis, and the like, and perform floor control, i.e., manage access rights to shared resources in a conferencing environment.

Application Server 186, e.g., a SIP Application Server, OSA Application Server, CAMEL IM-SSF application server, or other application server, may offer value added services to system 100 and reside either in the user's home network or in a third party location. The third party could be a network or simply a stand-alone AS. Application Server 186 may influence and impact a SIP session on behalf of the services supported by the operator's network. An AS may host and execute services.

IMS functioning is access network agnostic. However, the connectivity of each access network to the IMS infrastructure is specific to the access network.

Voice Call Continuity (VCC) from circuit UMTS 130 to IMS 170 (VoIP over IMS) is being specified in 3GPP. Two logical functions, a Call Continuity Control Function (CCCF) and Network Domain Selection (NeDS), are added to the architecture to support VCC.

The Call Continuity Control Function provides for reception and processing of call continuity requests caused by radio related events, e.g., availability or loss of radio coverage, and establishment and release of call legs needed to transfer a voice call from the CS domain to the IMS domain, or vice versa.

Network Domain Selection (NeDS) comprises the control point for selecting which domain to use for terminating a call. Normally it may be expected that a CS terminating call will terminate on the CS side of a multi-mode terminal, and an IMS terminating call will terminate on the IMS side of a multi-mode terminal, although there are situations where the selection of the other domain is appropriate, e.g., in the case of a CS terminating call when the terminal is not CS-attached but is IMS registered. In addition to technical considerations, user preferences and service availability considerations may be considered and may be implemented in the NeDS function. The UE may be registered to both domains and may choose to originate a voice call (or session) via either CS or IMS domain, depending on operator offered choices.

A UE facing an infrastructure such as the one depicted in FIG. 1 faces a variety of challenges ranging from supporting several new applications enabled by IMS, protocols required by those services such as SIP/SDP/RTP/etc., and handheld devices with multiple radios.

Exemplary applications and services that may be supported by IMS 170 include web browsing, video sharing, video telephony and conferencing, push to talk over cellular, presence services, instant messaging, multiplayer games, and concurrent IMS services and CS voice services.

With smart phones being adapted with more and more features of PDAs and PCs, the software component of the phone is gaining precedence over radio hardware that was the focus of 2.5G generation GSM/GPRS/IS-95 phones. A high level OS, e.g., Microsoft, Linux, Symbian, etc., is critical, with an ever increasing number of software components to be integrated including IMS client frameworks, new network and session management software, e.g., SIP/SDP, and RTP/RTCP, and richer telephony interface layers.

For the specific case of multimode convergence based on IMS, there are certain user scenarios that require management of the multiple access systems supported by the handset. Some of these scenarios include:

Support of multiple connections via multiple access standards e.g., video sharing via cellular and background email download via WLAN or WiMax;

Handling a second incoming call via another access standard;

Handover and mobility of data sessions and VoIP calls; and

Emergency call via best access standard.

As IMS infrastructure and service deployment progresses, handset vendors continue to face the same challenges that have been driving them over the past several years, e.g., the capability to offer new services and features in the handset without increasing cost of the handset, handset development cost, and time to market the handset.

Converged or convergence terminals, i.e., UEs compatible with IMS 170, have in many ways already taken root. However, while converged terminals have opened doors to the promise of multiple utility terminals, many existing devices are still somewhat service specific. The best examples currently are the camera phone and RIM BlackBerry™. Despite these current concerns and shortcomings, converged devices provide the promise of reaching the goal of one device that holds functionality for all forms of communications, computing, music, video, games, and personal efficiency.

To be suitably adapted to interface with various access networks, a converged terminal may be adapted to multiple modems. To accommodate multi-radio terminals for interfacing with multi-access networks, a converged terminal essentially needs multi-access awareness. A multi-radio device needs to be able to access different services through different access methods. Being able to access email via WLAN or GPRS from a smart phone, playing a game over Bluetooth with a friend in the same room and then inviting a far-away friend to join the game via 3G are examples of what activities are possible via IMS 170.

Management of handset resources is critical for a desirable user-experience in IMS 170. Because of the variety of applications that may be run via IMS 170, energy consumption can be expected to increase as additional applications and more processor-intensive services are deployed. However, improvements in battery capacity simply haven't kept pace with ever-more-powerful processors and other power consumers in the handset. Accordingly, efficient management of power consumption mechanisms are provided by embodiments disclosed herein.

With the addition of new features and services, handset development costs and time to market continue to be important factors in UE design. Modular designs that feature various sub-systems that may be obtained from a variety of vendors may advantageously reduce handset development costs.

Figure 2:
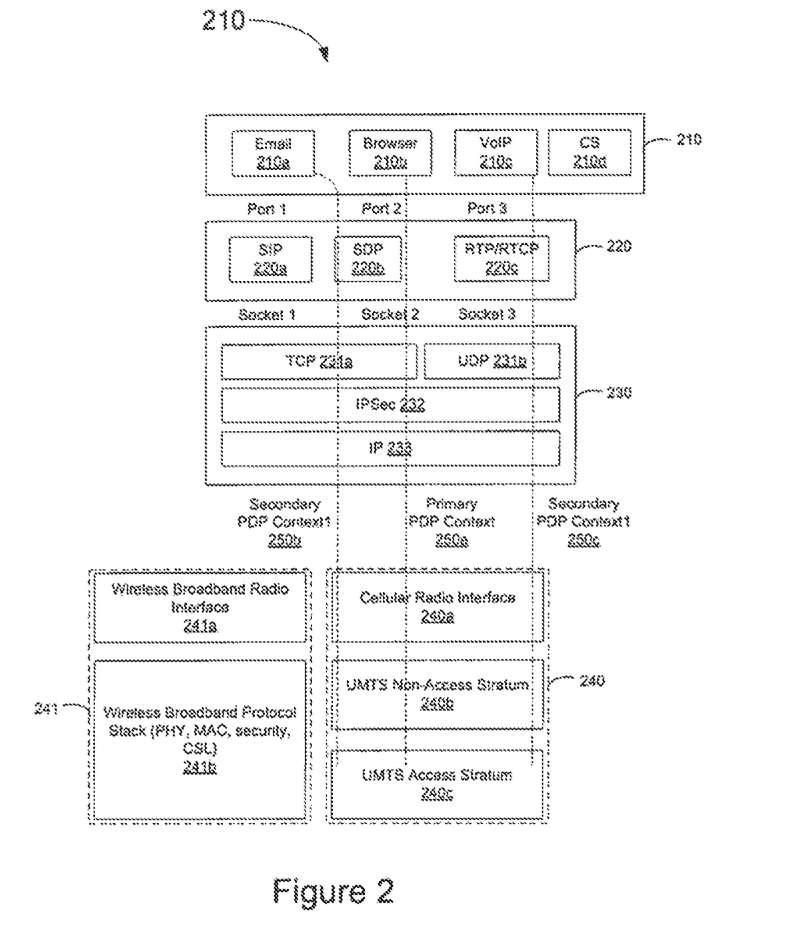
FIG. 2 depicts a diagrammatic representation of an embodiment of a multi-mode terminal.

With reference now to FIG. 2, an exemplary software configuration 200 of a converged terminal is depicted. Various applications 210 may be deployed in configuration 200. In the illustrative example, applications 210 include an Email application 210a, a browser application 210b, a VoIP application 210c, and a circuit-switched application 210d. Applications 210 are bound to application layer 220, e.g., via traditional sockets and ports as shown in FIG. 2. In the illustrative example, application layer 220 includes SIP 220a, SDP 220b, and RTC/RTCP 220c.

SIP 220a is an application layer protocol. Session Initiation Protocol (SIP) was developed and designed within the Internet Engineering Task Force (IETF). SIP is a request-response signaling protocol for setting up and starting voice, video, and instant messaging communication sessions over the Internet.

SIP's essential communication function is aided by extensions and further protocols and standards. Two protocols commonly used are the Session Description Protocol (SDP) 220b and Real-time Transport protocol 220c (RTP).

RTP 220c is used to carry session payload data, such as real-time multimedia data such as audio, video, and text. RTP 220c encodes and splits the data into packets and transports such packets over the Internet. RTP 220c is frequently used in streaming media systems as well as videoconferencing and push to talk systems making it the technical foundation of the Voice over IP industry. RTP may be used in conjunction with the RTP Control Protocol (RTCP) and it is built on top of the User Datagram Protocol (UDP).

SDP 220b describes and encodes capabilities of session participants. Such a description is then used to negotiate the characteristics of the session so that all devices can participate. Hence, SIP, SDP, and RTP/RTCP are necessary to implement an application such as a "SIP-based VoIP" protocol.

Application layer 210 may interface with lower layers of network stack 230. In the illustrative example, network stack 230 includes a transmission control protocol (TCP) 231a and a user datagram protocol (UDP) 231b transport layers, an IP security (IPSec) 232 layer, and an IP 233 network layer, although other transport and network layers may be suitably substituted for those depicted.

Convergent terminals require the support of multiple protocol stacks 240 and 241 and multiple radios as shown in FIG. 2. The first impact is on the hardware that requires integration of the modem basebands onto the same system. In typical designs, the basebands of the various modems are implemented on different chips. Additionally, a converged device may feature the co-existence and simultaneous activity of multiple radios. The multiple modems need to be able to communicate with upper layers (typically IP) via identifiers such as the UMTS PDP contexts 250a-250c (illustratively designated with dashed lines) shown in FIG. 2. Each primary PDP context 250a is associated with a unique PDP address (which includes the IP address) and each secondary PDP context 250b-250c is associated with a primary context and helps support multiple QoS streams required by different applications supported in lower layers via different radio access bearers. Major cellular standards as well as emerging wireless broadband standards, such as WiMax, support well defined QoS classes. In the illustrative example, configuration 200 includes a first protocol stack 240 adapted to accommodate UMTS access and includes a cellular radio interface 240a, a UMTS non-access stratum 240b, and a UMTS access stratum 240c. A second protocol stack 241 adapted to accommodate wireless radio broadband access network may include a wireless broadband radio interface 241a and a wireless broadband protocol stack 241b, e.g., a wireless broadband physical (PHY) layer, media access control (MAC) layer, security and CSL layers, or the like.

Additionally, a converged device may feature a High level OS (HLOS), such as Symbian, Linux, and Microsoft Windows Mobile. HLOS vendors or associated groups, such as Mobilinux Open Framework, are offering more integrated features in their software packages such as IPv6, 2.5G and 3G radio interface layers and connectivity management software.

A profile of applications supported by the UE may be used for connectivity and handover decisions, for example latency requirements, bandwidth requirements (qualitative/quantitative). The available applications supported by each available access system may be considered for connectivity/handover decisions. In accordance with embodiments, an inter-system connectivity and handover decision entity is disposed in the UE as are the connectivity and handover execution entities.

Periodically the handover decision entity in the UE executes the following steps:

collect network strength indications from each of the radios; and collect battery information from battery monitor.

For each on-going application, the following evaluation steps may be executed:

Is the current connectivity the "best" one based on information connected in the previous step and the input sources including the set of rules provided by the service provider, user profile based on usage, user profile based on service subscriptions, and the profile of applications supported by the UE. If yes, do nothing, if no either automatically handover to a new access connectivity, or notify the user and request a decision.

In accordance with embodiments disclosed herein, a Convergence Manager (CM) provides connectivity management and, among other services, mobility across various network standards. The CM provides for multimode mobility management and multimode data plane management within the CM and facilitates cellular plus wireless broadband terminal convergence, including service continuity and handoff between cellular and wireless broadband.

Figure 3:
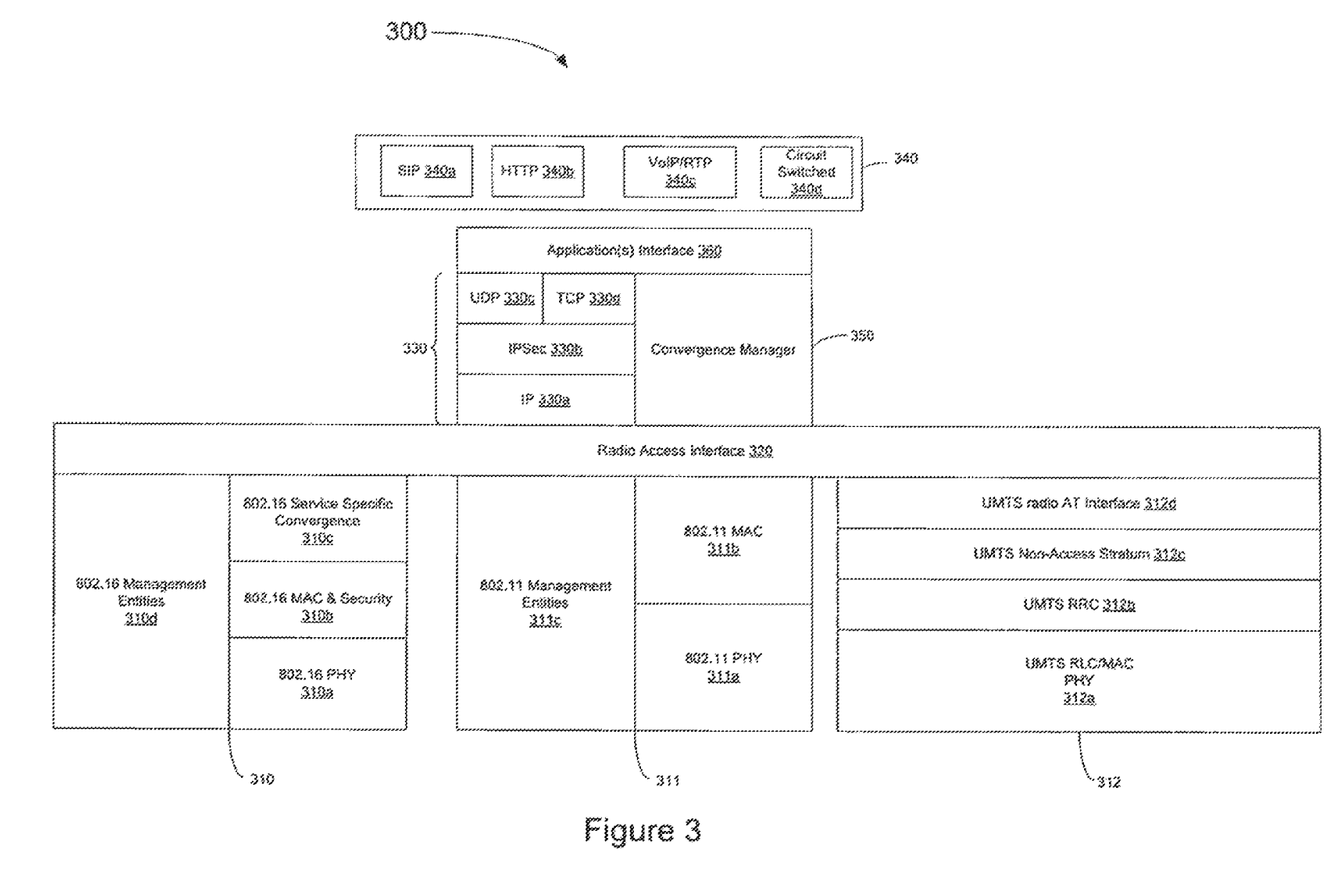
FIG. 3 is a diagrammatic representation of an embodiment of a converged device configuration featuring a Convergence Manager that provides various connectivity and mobility features.

FIG. 3 is a diagrammatic representation of an embodiment of a converged device configuration 300 featuring a Convergence Manager (CM) 350 that provides various connectivity and mobility features.

CM 350 interfaces with multiple access entities, such as 802.16 access entity 310, 802.11 access entity 311, and UMTS access entity 312. 802.16 access entity 310 includes a physical (PHY) layer 310a, a media access and control (MAC) layer 310b, and a service specific convergence layer 310c. 802.11 entity 311 includes a PHY layer 311a, MAC layer 311b, and management entities 311c. UMTS entity 312 includes a radio link controller (RLC)/MAC/PHY layer 312a, a radio resource control (RRC) layer 312b, UMTS Non-Access stratum 312c, and radio interface 312d. Access entities 310-312 may be communicatively coupled with radio access interface 320 that interfaces with upper layers, such as a network stack 330 and convergence manager 350. Network stack 330 may include a network layer, such as IP layer 330a, an IP security layer (IPSec) 330b, a transport layer, such as user datagram protocol (UDP) layer 330c or transmission control protocol (TCP) layer 330d. Network stack 330 and convergence manager 350 may interface with an application layer 340 via an application interface 360.

CM 350 may support multimode network and cell selection. CM 350 may be adapted to perform access network data collection including network scan and cell measurements optimized for low terminal power consumption. At power on, as per mode settings, CM 350 may scan for wireless broadband and cellular coverage and decide the best network to camp on.

CM 350 may feature operator and user customizable threshold and profiles. To this end, CM 350 may be adapted to receive as input a customizable set of operational thresholds, such as signal strength, power, call quality, etc., and user/operator profiles, rules for scan, network-selection, handover, etc., that will govern network selection and handover decisions between multiple access modes.

CM 350 may be adapted to perform periodic and event driven evaluation of connections and handover decisions. CM 350 may analyze the access data it collects from various protocol stacks, e.g., protocol stacks included in 802.16 entity 310, an 802.11 stack included in 802.11 entity 311, and a UMTS stack included in a UMTS entity 312, as well as to take into account the rules and profiles provided by the user or operators. Based on this information, CM 350 may make a connectivity or handover decision and communicate with the appropriate software entities for handover execution.

Entities 310-312 may interface with radio access interface 320 and network/transport stack layers 330. Various applications may be deployed at application layer 340, such as a SIP application 340a, an HTTP application 340b, a VoIP/RTP application 340c, a circuit-switched application 340d, such as a voice application, and may be bound to lower stack layers via application interface 360. Other applications that may be included in converged device configuration 300 may include an instant messaging (IM) application, a presence application, or any other suitable application that may be run by a user equipment.

CM 350 may be adapted to provide feedback to a network operator and/or end-user. CM 350 may provide feedback of results of its analysis of multimode access conditions and decisions to the operator, and in certain cases to the user. For example, operational feedback provided to the end-user may be provided via the handset application UI 360.

CM 350 may provide management of multiple access connections. To this end, CM 350 may allow and manage connections to multiple access networks simultaneously depending upon handset use cases supported. For example, voice call via cellular services may be provided while email is downloading via WLAN.

CM 350 may provide data session continuity. To this end, CM 350 may provide data session continuity as the user roams from coverage area of one mode to another if CM 350 decides based on its thresholds/rules/profiles that it is appropriate to move the connection from one access mode to another.

CM 350 may facilitate VoIP handover. For example, CM 350 may provide support for handover of VoIP calls from one access mode to another with the assumption that VoIP is supported over both cellular and wireless broadband access modes. Additionally, CM 350 may manage voice handover to/from a packet-switched access mode from/to a circuit-switched access mode.

CM 350 may support Voice Call Continuity (VCC). CM 350 may support continuity of a voice call from cellular circuit switched domain to VoIP over IMS over wireless broadband as specified by 3GPP.

CM 350 is preferably implemented to be compliant to all related 3GPP specifications, e.g., IMS, 3G-WLAN, VCC as well as aligned to the IEEE 802.21 Media Independent Handover.

CM 350 may provide inter-system data session continuity and voice handover between cellular and wireless broadband modes. CM 350 preferably allows mobility across multiple modes with the decision to handover taken based on a variety of parameters that operators and end users' preferences. The handover decision logic will be such that any ping-pong effect is minimized and the decision is optimized to use the connection best suited for the service. CM 350 may feature connection/handover decisions that advantageously minimize handset power consumption, provide a desired call quality, as well as provide the user the most cost effective service at any time thereby enabling a richer user experience. Moreover, CM 350 may make context driven connection decisions. For example, emergency calls may be initiated via the most robust connections available at any time.

CM 350 may allow operators to customize the rules governing connection and handover decisions. For example, an operator may decide that the UE must initiate all emergency calls via the cellular network, or that if the UE is within a WLAN coverage area any web browsing session must be initiated via the WLAN network. This feature may be associated with a default set of rules for easy usage but may also give maximum configurability to operators based on the operators' network design and business needs.

Figure 4:
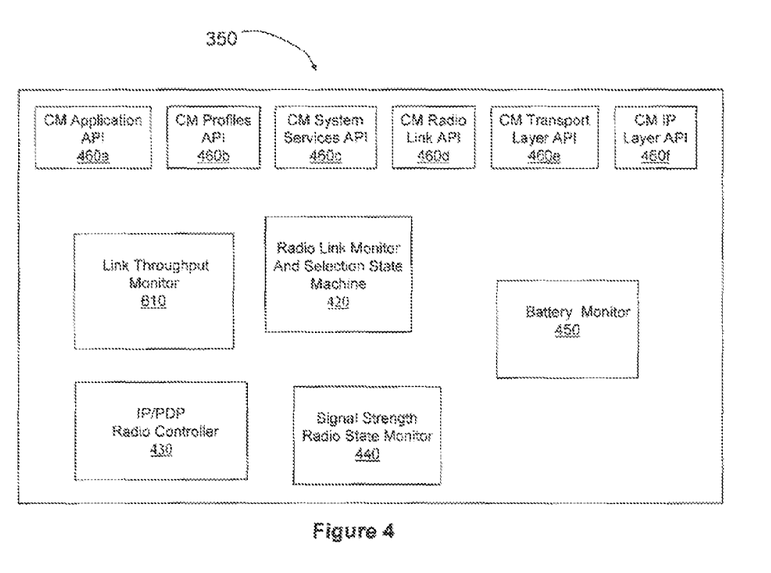
FIG. 4 is a diagrammatic representation of a convergence manager implemented in accordance with an embodiment.

FIG. 4 is a diagrammatic representation of CM 350 implemented in accordance with an embodiment. Convergence manager 350 manages connectivity to an access network based on access cost, access network availability, and the particular application(s) (among other considerations) to be run on the converged device. CM 350 provides a convergence solution that features seamless handover and auto-connectivity across cellular and wireless broadband networks to provide "always-on" connection to the Internet and voice based services. Connection management and handover decisions may be based on periodic and/or event driven decisions. CM 350 provides a unique connectivity and handover management for terminal-based access network selection. CM 350 facilitates efficient management of simultaneous connections to different access networks, e.g., voice over cellular and email over WLAN. Moreover, CM 350 provides low latency start up and incoming calls providing seamless continuity of real time services, e.g., voice between cellular and wireless broadband coverage. Additionally, CM 350 provides access to emergency services, power management of multimode activities.

CM 350 may facilitate multimode network scan to facilitate terminal-based connectivity decisions. Additionally, CM 350 provides multimode mobility handling across wireless broadband and cellular, simultaneous wireless broadband and cellular connection management, power management of multimode activities, e.g., smart network scan and measurement, operator and user customizable rules for connectivity and roaming, voice call continuity (e.g., handover), and data session continuity. End-user benefits of CM 350 include unified access convergence management for multi-radio handsets, access and application aware decisions of best or most desirable connectivity, unified connectivity interface to network (e.g., TCP/IP) and session management (e.g., SIP/SDP) layers, multimode mobility handling across WiBro/WiMax, Cellular, WLAN, or other access networks.

CM 350 may be implemented as a group of software modules deployed on the UE that make decisions regarding what is the best or preferable access system for establishing connectivity to the wired (cable, DSL, etc.) or wireless (WLAN, WiMax, cellular such as GSM/GPRS, CDMA, UMTS, etc.) network infrastructure as well as when to handover the connectivity from one access system to another. Connectivity management and handover decisions may be made based on rules configured by the service provider(s) and/or end-user preferences, a user profile based on expected usage, user profile based on service subscriptions, requirements of specific applications—both circuit switched and packet switched—environmental conditions such as signal strengths of each access network, and user equipment power conditions.

In addition, CM 350 provides a transparent network layer to the upper layers. CM 350 offers IP/PDP context control, including activation, modification, and de-activation. In this way, CM 350 hides lower layer details, both functional and implementation specific, from the upper layers, and provides a complete IP layer platform for the upper layers.

CM 350 may include a link throughput monitor 410 to measure the throughput of links between the host UE and access networks. CM 350 may include a radio link monitor and selection state machine 420 that facilitates evaluation of link metrics and access network selection. Additionally, CM 350 may include an IP/PDP radio controller 430 and a signal strength radio state monitor 440. A battery monitor 450 may be included to monitor battery usage/capacity of the host UE battery.

CM 350 may include or interface with various application programming interfaces (APIs). In the illustrative example, CM 350 includes an application API 460*a*, a CM profiles API 460*b*, a CM system services API 460*c*, a CM Radio Link API 460*d*, a CM transport layer API 460*e*, and a CM IP layer API 460*f*.

CM 350 may manage AT commands to the mobile terminal (MT), interfaces between VCC applications and the MT, register with cellular networks, manage WLAN layer 1 (L1)/layer 2 (L2) to be ready for communications, monitor radio quality and inform VCC application(s) of radio quality status, and trigger fast handover from/to GSM/W LAN.

CM Application API 460*a* may feature an open/close socket function used to open a socket with QoS parameters on a particular host IP. IP/PDP activation is preferably made when the open command is made. For wireless broadband, an open socket command may be made before IP is available. In this case, an implicit IP activation procedure may take place.

CM Application API 460*a* may feature an IP/PDP activation/modification function including one or more of an explicit activation/modification function, an implicit activation/modification function, and an automatic activation/modification function. An explicit activation/modification function is activated directly by upper layers, while an implicit activation/modification function is activated when a socket open request is made. An automatic activation/modification function may provide an indirect activation by the upper layers that, for example, direct CM 350 to activate the IP/PDP with QoS appropriate for IMS activation when a new access network is detected.

A radio link state status request/Indicator function may be used to check on the status of the radio link. For example, PDP context information such as QoS, IP address, Radio link state (PDP context state, P/S attached, etc.) may be obtained.

A radio link selection request/Indicator function based on priority parameters or profiles may be used to query which radio link should be used for a particular application. The radio link selection request function may be application dependent because each application may have different criteria for radio link selection. Radio link selection priorities may be based on the default profile database or passed to the radio link selection request function as parameters. The Indicator can also be event triggered and can signal to the IMS services that a change of domain should be made for a certain application or for all applications. This request/Indicator is serviced by the main decision maker that determines which applications should be mapped to which radio link and when.

Link event triggers may include upper layer trigger events, such as time to register, time to handover, time to establish IP/PDP context, and link layer events, such as link lost or weak link, and manual switch events.

In accordance with another embodiment, UE-based inter-access-mode connectivity and handover decisions may be made by CM 350. Decisions may be made in a UE regarding what is the best access system for establishing connectivity to the wired (cable, DSL, etc) or wireless (WLAN, WiMax, cellular such as GSM/GPRS, CDMA, UMTS, etc) network infrastructure as well as when to handover the connectivity from one access system to another. This decision may be made based on rules configured by the service provider(s), user profile based on expected usage, user profile based on service subscriptions, requirements of specific applications—both circuit switched and packet switched based, and environmental conditions such as signal strengths of each network, and user equipment power conditions.

Inter-access-mode connectivity and handover decisions may be made based on various sources of input information including a set of rules provided by the service provider, user profile based on usage, user profile based on service subscriptions, profile of applications supported by the UE, battery monitor in the UE, signal strength indicator of each access system as seen by the UE, and applications supported by the available access systems. A set of rules provided by the service provider may include, for example, a requirement to always make emergency calls via a cellular access network whenever a cellular access network is available, a requirement for voice calls to always be made using VoIP over WLAN if WLAN connectivity is available, and alternatively to use a cellular access network in the event that WLAN connectivity is not available. User profile based on usage rules may include, for example, prioritization of user concerns, such as cost, power consumption, low latency for service start up, low latency for receiving calls/email/IM/data, continuity of real time services, sense of always connected for non-real time services, availability of emergency services, and the like.

Rules based on user profile service subscriptions may evaluate whether single or multiple providers are associated with various available access systems.

A battery monitor in the UE may also be used for connectivity/handover decisions. For example, if a battery capacity falls below a particular threshold, preference may be assigned to a lower power retirement access network. A signal strength indicator of each access system as seen by the UE may be based on network scanning and measurement. In an embodiment, the connectivity and handover decisions are made by CM 350.

Periodically the handover decision entity in the UE executes the following steps:

collect network strength indications from each of the radios; and collect battery information from battery monitor.

The UE may execute the following steps for connectivity/handover when certain "events" occur. Exemplary events include:

User wants to start a certain application: An action for this event is determining what the best access network for this application is and initiate connectivity based on analysis of all the sources of input information.

As described, mechanisms are provided for choosing a network for connection and handover based on the application requirements of a multi-mode, multi-radio user equipment. The selection of the network for connectivity and handover is based on one or more of the invoking of an application, the invoking of a second application, and the closing of an application.

The UE may execute the following steps for connectivity/handover when certain "events" occur. Exemplary events include:

Battery power below a certain threshold: An action for this event may be switching off all radios except cellular and shutting down all applications except any on-going cellular voice call.

Battery drain above a certain threshold: switch to the network that uses lower power for the current application.

Signal strength of a certain network goes above a certain threshold. An action for this event may be adding this network as part of the periodic decision process.

Figure 5:
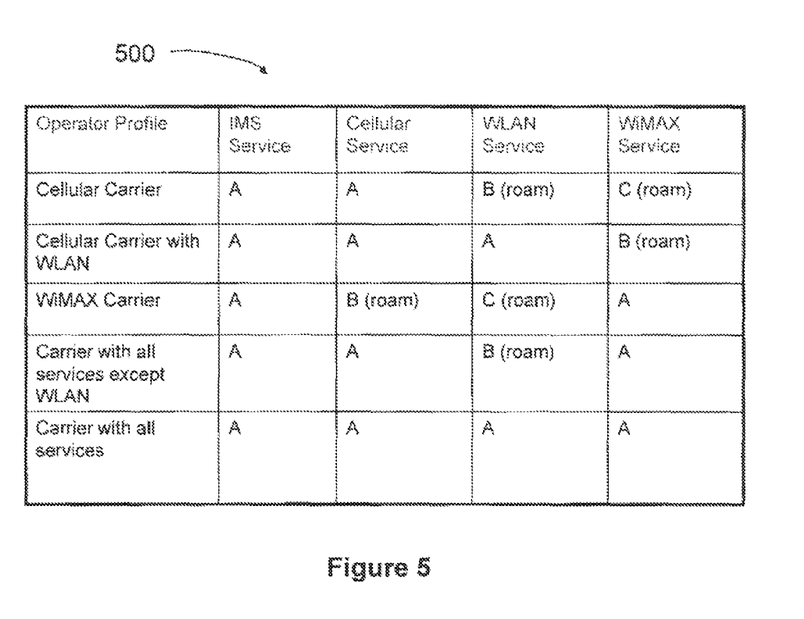
FIG. 5 is a diagrammatic representation of an embodiment of a user subscription profile that depicts operator profiles of access network operators that may be used for connectivity/handover decisions.

FIG. 5 is a diagrammatic representation of a user subscription profile 500 that depicts operator profiles of access network operators (designated "A", "B", and "C"; where "A" indicates service provided by the home carrier's network(s), and "B", "C" are services provided by another network operator/carrier, hence marked "roam") that may be used for connectivity/handover decisions. CM 350 may evaluate profile 700 to evaluate the operator service offerings, e.g., IMS, cellular, WLAN, WiMAX, and the like.

Figure 6:
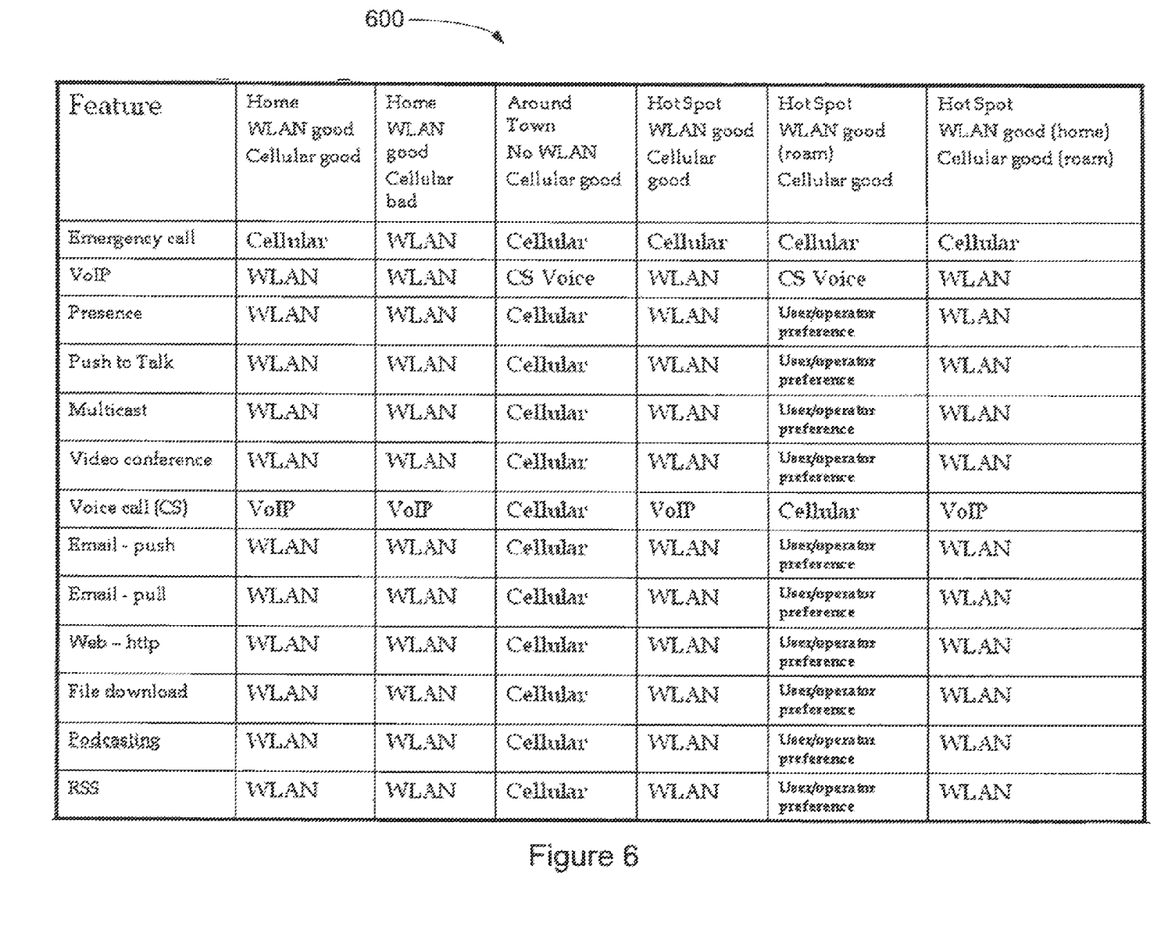
FIG. 6 is a diagrammatic representation of an embodiment of an operator rules profile that defines various services and corresponding preferred access networks.

FIG. 6 is a diagrammatic representation of an embodiment of an operator rules profile 600 that defines various services, e.g., emergency call, VoIP, presence, and other services, and corresponding preferred access networks. In the illustrative example, a preferred access network may be dependent on a relative quality assessment of an access network. For instance, if both WLAN and cellular access network qualities, e.g., signal strengths, throughput, or other metric, are evaluated as "good," preference may be assigned to the cellular access network for an emergency call service. However, if the cellular access network quality is evaluated as bad, preference may be assigned to WLAN for performing an emergency call service. In accordance with another embodiment, mechanisms for inter-system monitoring and connection state management for multi-mode networks and terminals are provided. Advantages of mechanisms disclosed herein provide for low power consumption, preparation for quick, seamless handovers, and an "always on" environment in the terminal.

Consider the following Scenario: Switch from WLAN to Cellular

In this scenario, no real time service is active at this point. The CM senses that the WLAN network is getting weak, or possibly already out of service, and services need to be transferred to Cellular.

In the selection to determine which radio network should be primary and which secondary, the following exemplary parameters may be evaluated:

cost power coverage/signal strength/call quality connectivity/application priority (emergency call, real time service, non-real time service, best effort, etc.)

service provider's preferences user's preferences

If power is an issue, the WWAN or cellular network may be designated for preference for always on applications if cellular provides better standby time.

User preferences may be assigned to any one or more of the following exemplary considerations:

Total cost

Standby and talk time

Low latency for service start up
Low latency for receiving calls, email, IM, and data
Call Quality
Continuity of real time services
sense of always connected for non-real time services
availability of emergency services
Ease of use
Connectivity and handover may be user-optimized based on the user preferences.

As described, mechanisms providing for decision-making criteria in a multi-mode, multi-radio user equipment to choose which radio network to use for connectivity and handover are provided. Decision making depends on a number of different criteria: a user profile that specifies one or more user preference connectivity attributes, available applications of the user equipment, a service subscription of a user associated with the user equipment, a battery monitor of the user equipment, a respective link metrics indicator for each of the plurality of access networks, and application support capabilities of the plurality of access networks.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure. For example, descriptions of a UE convergence manager have been provided in the context of a UE deployed in a network system featuring IMS. However, such a network system is not necessary, but rather advantages may be had by implementation of embodiments disclosed herein in any multi-mode network system that features multiple access network technologies with or without IMS. Accordingly, all such changes, substitutions and alterations are intended to be included within the scope of the present disclosure as defined in the following claims.

We claim:

1. A method of operating a mobile device comprising:
    connecting to a WIFI network and a cellular network;
    displaying an indication of availability of the WIFI network and the cellular network;
    accessing data through the WIFI network in response to an application request from an application executing on the mobile device;
    detecting a first condition indicative of a quality of the WIFI network;
    detecting, in response to a subsequent application request and before or at a time of receiving a response to the subsequent application request, a second condition indicative of a time responsiveness of the WIFI network;
    evaluating user settings, wherein the user settings include a roaming rule, a connectivity rule, and an application profile of the application;
    in response to detecting the first condition and the second condition and evaluating the user settings, determining a time responsiveness of the cellular network; and
    based on the detected first condition and detected second condition, the evaluated user settings, the time responsiveness of the cellular network, and the application executing on the mobile device, sending the subsequent application request through the cellular network in response to the application request executing on the mobile device, wherein requests from another application executing on the mobile device continue to access data through the WIFI network.

2. The method of claim 1, wherein sending requests to the cellular network is performed on an application-by-application basis such that the requests are evaluated for sending to the cellular network for each application making requests.

3. The method of claim 1 wherein detecting the first condition further comprises:
    evaluating a network preference.

4. The method of claim 1 wherein the quality of the WIFI network is based on signal strength.

5. The method of claim 1 wherein the quality of the WIFI network is based on network throughput.

6. The method of claim 1, wherein each of the WIFI network and the cellular network are operating in a respective TCP session.

7. The method of claim 1, wherein detecting the first condition or the second condition is performed in response to a socket open request.

8. The method of claim 1, further including registering the mobile device with the cellular network.

9. The method of claim 8, wherein sending requests to the cellular network is further based on registration of the mobile device with the cellular network.

10. The method of claim 1, wherein sending requests to the cellular network occurs while the mobile device remains connected to the WIFI network.

11. The method of claim 1, wherein sending requests to the cellular network is further based on an application programming interface (API).

12. The method of claim 1, further including sending requests of the mobile device to the WIFI network at a subsequent time based on the time responsiveness of the WIFI network and the cellular network at that subsequent time and the application executing on the mobile device.

13. The method of claim 1, wherein requests from another application executing on the mobile device are not sent to the cellular network.

14. A mobile device comprising:
a memory and a processor;
a network interface operable to:
  connecting to a WIFI network and a cellular network;
  displaying an indication of availability of the WIFI network and the cellular network;
  accessing data through the WIFI network in response to an application request from an application executing on a mobile device;
  detecting a first condition indicative of a quality of the WIFI network;
  detecting, in response to a subsequent application request and before or at a time of receiving a response to the subsequent application request, a second condition indicative of a time responsiveness of the WIFI network;
  evaluating user settings, wherein the user settings include a roaming rule, a connectivity rule, and an application profile of the application;
  in response to detecting the first condition and the second condition and evaluating the user settings, determining a time responsiveness of the cellular network; and
  based on the detected first condition and detected second condition, the evaluated user settings, the time responsiveness of the cellular network, and the application executing on the mobile device, sending the subsequent application request through the cellular network in response to the application request executing on the mobile device,
  wherein requests from another application executing on the mobile device continue to access data through the WIFI network.

15. The mobile device of claim 14, wherein the network interface is further operable to send requests to the cellular network on an application-by-application basis such that the requests are evaluated for sending to the cellular network for each application making requests.

16. The mobile device of claim 14, wherein the first condition is detected by evaluating a network preference.

17. The mobile device of claim 14, wherein the quality of the WIFI network is based on signal strength.

18. The mobile device of claim 14, wherein the quality of the WIFI network is based on network throughput.

19. The mobile device of claim 14, wherein each of the WIFI network and the cellular network are operating in a respective TCP session.

20. The mobile device of claim 14, wherein the network interface is further operable to detect the first condition or the second condition in response to a socket open request.

21. The mobile device of claim 14, wherein the network interface is further operable to register the mobile device with the cellular network.

22. The mobile device of claim 21, wherein the network interface is further operable to send requests to the cellular network based on registration of the mobile device with the cellular network.

23. The mobile device of claim 14, wherein the network interface is further operable to send requests to the cellular network while the mobile device remains connected to the WIFI network.

24. The mobile device of claim 14, wherein the network interface is further operable to send requests to the cellular network based on an application programming interface (API).

25. The mobile device of claim 14, wherein the network interface is further operable to send requests to the cellular network based on a user preferences.

26. The mobile device of claim 14, wherein the network interface is further operable to send requests from the mobile device to the WIFI network at a subsequent time based on the time responsiveness of the WIFI network and the cellular network at that subsequent time and the application executing on the mobile device.

27. The mobile device of claim 14, wherein requests from the another application executing on the mobile device are not sent to the cellular network.

28. The mobile device of claim 14, wherein a functionality to send a request through the cellular network is enabled or disabled by a user of the mobile device.

* * * * *

UNITED STATES PATENT AND TRADEMARK OFFICE
CERTIFICATE OF CORRECTION

PATENT NO. : 9,648,557 B2
APPLICATION NO. : 14/506622
DATED : May 9, 2017
INVENTOR(S) : Chaitali Sengupta and Yuan Kang Lee

It is certified that error appears in the above-identified patent and that said Letters Patent is hereby corrected as shown below:

In the Claims

In Column 14, Line 31, insert the word --subsequent-- before the word "application".

In Column 15, Line 32, insert the word --subsequent-- before the word "application".

Signed and Sealed this
Ninth Day of April, 2019

Andrei Iancu
*Director of the United States Patent and Trademark Office*